United States Patent
Herr et al.

(10) Patent No.: US 7,093,097 B2
(45) Date of Patent: Aug. 15, 2006

(54) DYNAMIC SELF-TUNING MEMORY MANAGEMENT METHOD AND SYSTEM

(75) Inventors: Brian D. Herr, Rhinebeck, NY (US); Joseph J. Kavaky, Red Hook, NY (US)

(73) Assignee: International Business Machines Corporation, Armonk, NY (US)

( * ) Notice: Subject to any disclaimer, the term of this patent is extended or adjusted under 35 U.S.C. 154(b) by 534 days.

(21) Appl. No.: 09/994,443

(22) Filed: Nov. 27, 2001

(65) Prior Publication Data
US 2003/0101324 A1    May 29, 2003

(51) Int. Cl.
G06F 12/00 (2006.01)

(52) U.S. Cl. .................. 711/171; 711/104; 711/173

(58) Field of Classification Search ................ 711/102, 711/103, 115, 105, 154, 170, 171, 173
See application file for complete search history.

(56) References Cited

U.S. PATENT DOCUMENTS

| | | | |
|---|---|---|---|
| 4,503,501 A | 3/1985 | Coulson et al. .............. 711/129 |
| 5,129,088 A | 7/1992 | Auslander et al. .............. 711/1 |
| 5,247,660 A | 9/1993 | Ashcraft et al. ............. 707/205 |
| 5,491,808 A * | 2/1996 | Geist, Jr. .................... 711/100 |
| 5,689,707 A * | 11/1997 | Donnelly .................... 707/206 |
| 5,727,178 A | 3/1998 | Pletcher et al. .............. 711/202 |
| 5,897,661 A | 4/1999 | Baranovsky et al. ......... 711/170 |
| 5,933,855 A | 8/1999 | Rubinstein .................. 711/200 |
| 5,956,745 A | 9/1999 | Bradford et al. ............ 711/137 |
| 5,963,737 A * | 10/1999 | Mealey et al. ............... 712/244 |
| 6,058,460 A | 5/2000 | Nakhimovsky .............. 711/153 |
| 6,070,202 A | 5/2000 | Minkoff et al. ................ 710/56 |
| 6,226,725 B1 * | 5/2001 | Yarborough ................ 711/170 |
| 6,247,105 B1 * | 6/2001 | Goldstein et al. ........... 711/170 |
| 6,366,994 B1 * | 4/2002 | Kalyur ....................... 711/173 |
| 6,381,682 B1 * | 4/2002 | Noel et al. .................. 711/153 |
| 6,526,494 B1 * | 2/2003 | Kougiiouris et al. ....... 711/170 |
| 6,542,978 B1 * | 4/2003 | Goldstein et al. ........... 711/170 |
| 2002/0133678 A1 * | 9/2002 | Mathews et al. ........... 711/153 |
| 2003/0101324 A1 * | 5/2003 | Herr et al. ................... 711/170 |

OTHER PUBLICATIONS

Tezuka et al., "Pin-down Cache: A Virtual Memory Management Technique for Zero-copy Communication", © 1998 IEEE, p. 308-314.*

* cited by examiner

*Primary Examiner*—Brian R. Peugh
(74) *Attorney, Agent, or Firm*—Lawrence D. Cutter; Jose Gutman; Fleit, Kain, Gibbons, Gutman, Bongini & Bianco P.L.

(57) ABSTRACT

A method and system for maintaining a pinned kernel memory pool from which memory buffers are allocated to time critical processing tasks. The memory pool initially comprises a base block of pinned kernel memory to which additional memory blocks are added as more buffers are requested. Non-contiguous memory blocks may be used because they are maintained as a linked list. New buffer requests are satisfied from the earliest added blocks. The most recently added memory blocks are periodically examined for use to determine if they are in use and are returned to the kernel memory pool if they are unused.

19 Claims, 4 Drawing Sheets

DYNAMIC SELF-TUNING MEMORY MANAGEMENT METHOD AND SYSTEM

BACKGROUND OF THE INVENTION

1. Field of the Invention

The present invention generally relates to the field of computer memory management systems, and more particularly relates to a method and system for managing pinned kernel memory used as data buffers for time sensitive processing.

2. Description of Related Art

Many types of data processing equipment utilize virtual memory that allows data being handled by the processor to be stored in a combination of physical memory and mass storage. Virtual memory allows a processor to utilize memory in excess of that available in actual physical memory connected to the processor. The operation of virtual memory results in some data being stored in a mass storage device, such as a hard disk drive, and the swapping, or paging, of data between physical memory and mass storage as data stored in mass storage is required to be accessed by the processor. An attempt to access data that is stored in mass storage, which is referred to as a page fault, requires that the data be swapped into physical memory. The swapping of data between physical memory and mass storage may introduce a relatively long delay in access to the data as compared to accessing data already stored in physical memory. An excessive amount of data swapping from physical memory to mass storage is referred to as "thrashing" and has a detrimental impact upon system performance.

Electronic data processing equipment are often required to perform data communications with remote equipment. The data produced by a data storage system or other data processing systems must often be relayed to other computers or to other data processing equipment in order to be useful. Efficient utilization of processing resources to perform these data communications tasks is required in order to minimize equipment cost and maximize the usefulness of the data processing equipment.

The availability of powerful microprocessors has also made the distribution of processing among several computers, which are interconnected together by a communications network, an attractive alternative to using a central, monolithic computer system. A series of computers which are interconnected by a network may also host computer applications that are able to partition their processing among several nodes in order to realize greater performance. Such computers are required to implement data communications processing which efficiently utilize computing resources.

Interconnected computer systems consist of a number of separate computing systems coupled with an inter-processor communication mechanism, such as a network or a communications switch. Each computing system has its own processor, memory, and I/O subsystems and each typically runs a separate instance of an operating system. Interconnected computer systems may also be configured to allow applications to run in an abstract fashion independently of a given computing system, a manner which treats all nodes in a cluster as equivalent. These systems may also allow a computer system to access data processing resources that are located in any other computer system that is part of the interconnected computer system.

Different approaches are used to provide access to data processing resources on one computer system to all of the computer systems that are part of an interconnected computer system. One application of this architecture provides one or more centrally accessible remote data storage devices that communicate to all interconnected processors. Distributed file systems, such as NFS, AFS, and DFS, are all operable in a manner which allows applications on one processor to access remote data storage devices. These file systems often present abstract data storage functions to the application and preclude the application from controlling the storage details of the data storage.

In order to maximize processing efficiency and meet processing time requirements, the data communications processing in a computer system, or other data processing equipment that is part of an interconnected computer system, often stores data in temporary memory buffers that are held in a fixed physical memory location within the data processing equipment. The data buffers are stored in the memory space used by the operating system of the processing equipment, which is referred to herein as the "kernel" memory. The kernel memory used for the data communications buffer is configured so that the data in that memory is not paged out of real memory so that the data is ready for immediate access by the processing hardware. Configuring the memory to prevent paging out of the data stored in that portion of memory is referred to as "pinning" the memory. This ensures that page faults do not occur for data access to the temporary buffer. Pinning kernel memory has an adverse impact upon other processing operations within the data processing equipment since the kernel memory that is pinned by one process is not available to support processing of other processing tasks. The pinning of kernel memory also limits the memory management flexibility of the processing module that is pinning the memory.

Prior art data communications processing components of data processing equipment pin a fixed amount of kernel memory in a large, contiguous memory block and stores communication data into buffers that are allocated within that fixed kernel memory block. This operation requires that this fixed amount of kernel memory be pinned and allocated to processing by the external data communications processing component during initialization. That fixed amount of contiguous kernel memory then remains pinned during all subsequent operations. Selection of the amount of fixed kernel memory to allocate to external data communications processing requires trading off external data communications performance with the processing performance of other processing tasks performed by the data processing equipment. Allocation of an insufficient amount of pinned kernel memory to external data communications processing results in queuing of external data communications data messages, which degrades the performance of the data processing equipment as observed by external users. Allocation of too much pinned kernel memory results in degraded performance of other processes within the data processing equipment since the amount of kernel memory available to those other processes is reduced. The identification of the proper amount of pinned kernel memory to allocate to the external data communications processing is hindered by the fact that the amount is dependent upon a peak external data communications demand.

Therefore a need exists to overcome the problems with the prior art as discussed above, and particularly for a way to more efficiently utilize system kernel memory within data processing equipment to support time sensitive processing tasks such as external data communications processing.

SUMMARY OF THE INVENTION

According to one aspect of an example embodiment of the present invention, a dynamic self tuning memory management system and method allocates pinned kernel memory for use by time sensitive data communications processing. The system and method establishes a base pinned kernel memory pool and accepts requests for pinned kernel memory buffers. The requests for pinned kernel memory buffers comprise a specification of the size of the requested buffer size. The system and method also determines if the base pinned kernel memory pool contains sufficient memory for the requested pinned kernel memory buffer and the system and method then allocate, in response to determining that there is insufficient memory within the base pinned kernel memory block, an additional pinned kernel memory block that is at least as large as the buffer size. The additional pinned kernel memory blocks that are allocated are not required to form a contiguous memory section with the base pinned kernel memory pool.

According to another aspect of an example embodiment of the present invention, a dynamic self tuning memory management system and method releases memory allocated to a pinned kernel memory pool. The pinned memory buffers are temporarily allocated to processing modules and are not relocated within the pinned kernel memory pool. The pinned kernel memory pool comprises additional pinned kernel memory blocks that are sequentially added to the pinned kernel memory pool. The system and method periodically examines the additional memory blocks to determine if any can be released.

DESCRIPTION OF THE PREFERRED EMBODIMENTS

The present invention, according to a preferred embodiment, overcomes problems with the prior art by implementing a dynamic, self tuning memory management system which allocates pinned kernel memory blocks to a pinned kernel memory pool as additional memory is needed. The preferred embodiment also minimizes thrashing of memory allocation and release during short bursts of activity by only periodically releasing unused kernel memory from the pinned kernel memory pool.

The preferred embodiments of the present invention incorporate one or more processes which each initially configures a pinned kernel memory pool by pinning an initial base area of kernel memory. The preferred embodiment is configured to specify a maximum amount of pinned kernel memory which may be allocated to a processing module. As pinned kernel memory buffers are required for use by a processing module, pinned kernel memory buffers are allocated within the already pinned kernel memory pool. If there is insufficient memory available within the pinned kernel memory pool to satisfy a request for more memory by a processing module, that request results an additional block of pinned kernel memory being added to the pinned kernel memory pool that is associated with the requesting process. The preferred embodiment supports the definition of a maximum amount of kernel memory which may be pinned by a processing module. Once a process has pinned the maximum allowed amount of kernel memory, no additional kernel memory will be pinned by that process and the request for more pinned kernel memory fails. Failure of a memory request in the preferred embodiment results in queuing of the memory request.

Figure 1:
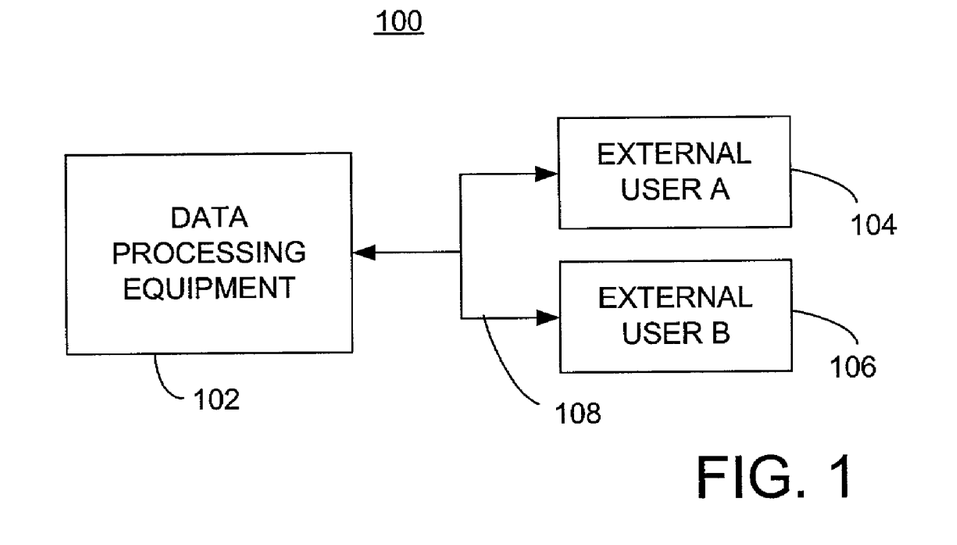
FIG. 1 is a block diagram illustrating the operational environment of example data processing equipment utilizing a dynamic self tuning memory management system in accordance with an example embodiment of the present invention.

An example operating environment 100 in which the preferred embodiments of the present invention operate is shown in FIG. 1. Data produced and/or received by the data processing equipment 102 is communicated over data communications network 108 with external users, such as external user A 104 and/or external user B 106. Although two external users are shown in the example operating environment 100, this and other embodiments allow a large number of external users to be in communications with the data processing equipment 102 through one or more data communications means. The data processing equipment 102 of these examples may be a data storage system incorporating a number of disk drives, or a central computer which produces and/or processes data for use by the external user A 104 and external user B 106. The communications network 108 may be implemented through a packet switched network based upon the TCP/IP or other communications protocol, a point-to-point communications network such as serial data communications or other communications means as are known to practitioners in the relevant arts. The communications network 108 may further use wired, wireless, fiber optic or other communications media to effect data communications. The external user A 104 and external user B 106 in the example embodiments may be other computers that receive and or transmit information to the data processing equipment 102, or external user A 104 and external user B 106 may be other devices that produce data for and/or receive data from the data processing equipment. An example of data processing equipment 102 is a file server, which executes a mass storage data server application processing module, that contains one or more hard disk storage units or other mass storage devices to store data that is provided to external users 104 and 106.

Figure 2:
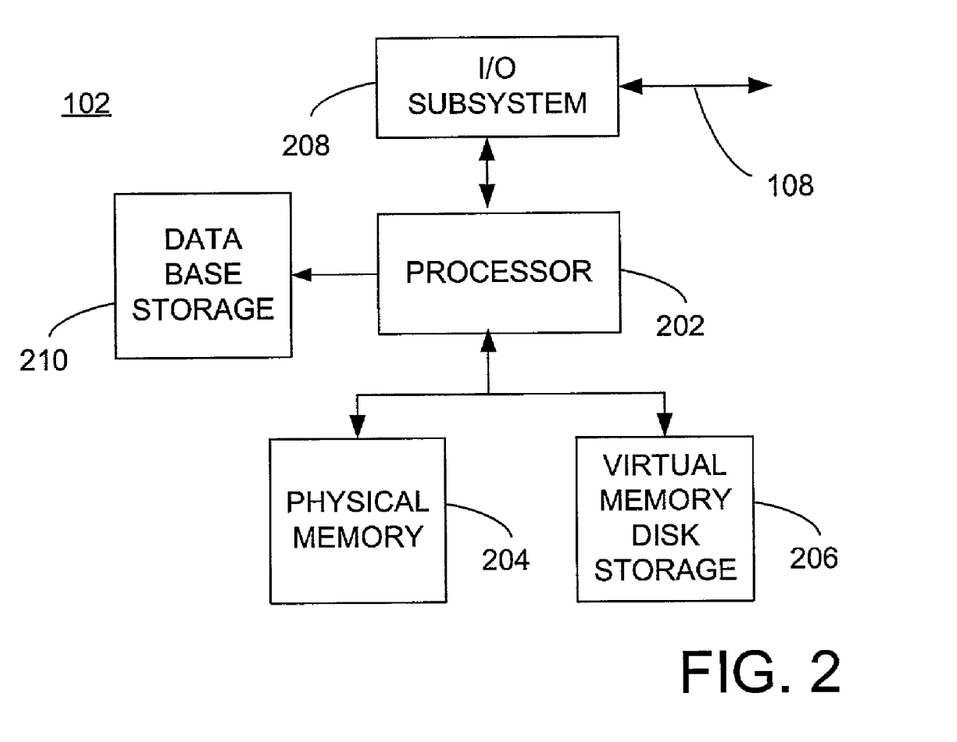
FIG. 2 is a block diagram of the processing components of example data processing equipment implementing a dynamic self tuning memory management system in accordance with an example embodiment of the present invention

An example schematic of the internal structure of exemplary data processing equipment 102 is illustrated in FIG. 2. The example data processing equipment 102 includes a processor 202, such as a PowerPC, an Intel Pentium or other computer processor. The processor 202 communicates with physical memory 204 and virtual memory disk storage 206. The kernel memory of the data processing equipment is located within the physical memory 204, and may comprise all of the physical memory 204 or a portion of the physical memory 204. The example data processing equipment 102 further comprises a data base storage 210 to store data maintained by data base applications. The data base storage 210 of the example data processing equipment of the example embodiment are accessed by data base applications that are operating on remote computers that communicate over the data communications network 108. Alternative embodiments include data base applications which locally execute on the processor 202 of the data processing equipment 102.

The processor 202 of the example data processing equipment 102 also communicates with an I/O subsystem 208. The I/O subsystem performs the interfacing functions required to implement data communications over the data communications network 108. Processor 202 of the example embodiment performs processing to support external data communications as well as other processing associated with other functions within the data processing equipment 102.

Processor 202 utilizes physical memory 204 to store data used for immediate processing. When the memory demands of the processing performed within the example data processing equipment 102 exceeds the amount of physical memory 204 that is within the data processing system, some of the data stored within the physical memory 204 is transferred to the virtual memory disk storage 206. This operation implements virtual memory, as is known to practitioners in the relevant arts. Part of the data stored in the physical memory 204 in the example embodiment is configured so as to prevent transferring the stored data to the virtual memory disk storage 206. The configuration of a memory block to prevent the data therein from being transferred from physical memory 204 to the virtual memory disk drive 206 is referred to as the "pinning" memory block. Portions of the physical memory 204 in the example embodiment are allocated for dedicated processing within a pinned kernel memory pool. A kernel memory allocation module manages the memory within the pinned kernel memory pool of the example embodiments. The processor 202 executing processing routines in accordance with the teachings of this specification implements the kernel memory allocation module of the example embodiments.

An example embodiment of the present invention is a part of the external data communications processing that is performed in association with a data storage subsystem. The external data communications processing in this data storage subsystem is used for communications of data that was retrieved from or is to be stored on a mass storage device, such as mass storage device data base storage 210, within the data processing equipment 102. The operation of the data communications processing in this example subsystem, which incorporates an example embodiment of the present invention, places data that is to be transmitted or that was received into buffers located within the pinned kernel memory pool. The data stored within these buffers are either transmitted out of the data processing equipment 102 or stored on the mass storage devices in a relatively short period of time. Once the data that is stored in these buffers has been transmitted or stored, the data buffer is no longer needed and the data communications processing releases the buffer for other uses. The memory which comprised that released buffer may then be reallocated to another pinned kernel memory buffer to satisfy a subsequent pinned memory buffer request. The example embodiments of the present invention allocate buffers that have a size of four kilobytes or integer powers of two times four kilobytes. The example embodiments support allocation of buffers up to one or more megabytes, although the buffer size is limited by the amount of physical kernel memory allocated to the pool.

Figure 3:
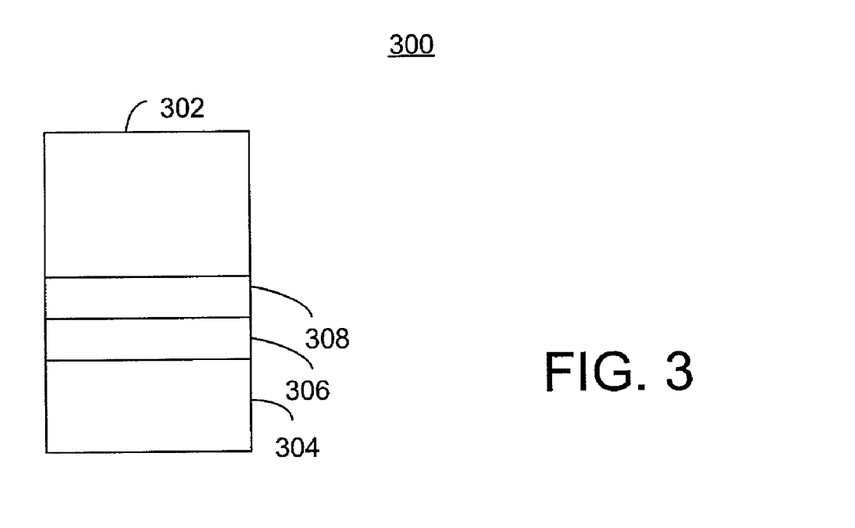
FIG. 3 is an illustration of an exemplary portion of kernel memory in a dynamic self tuning memory management system that has several allocated pinned kernel memory blocks therein, in accordance with an example embodiment of the present invention.

A simplified example physical memory configuration 300 is illustrated in FIG. 3. The physical memory configuration 300 shows an example memory address structure of the data storage 302 within the physical memory 204. The processing of a single processing module is described below for clarity, but the example embodiments of the present invention may perform similar processing for multiple processing modules which each utilize a separate pinned kernel memory pool. The processing module of the preferred embodiment of the present invention initializes processing by pinning a base pinned kernel memory block 304 as a base memory block. As additional pinned kernel memory is required, a first additional kernel memory block 306 is added to the pinned kernel memory pool by the kernel memory allocation module of the example embodiment. When the pinned kernel memory requirements of the processing exceed the pinned memory within the base pinned kernel memory block 304 and the first additional kernel memory block 306, a second additional kernel memory block 308 is added by the kernel memory allocation module. This is repeated until the maximum amount of kernel memory which may be pinned by the processing module is pinned by that processing module. The processing of the kernel memory allocation module of the example embodiment periodically examines the last added additional pinned kernel memory block, the second pinned kernel memory block 308 in the example embodiment. This examination determines if the last added additional pinned kernel memory block has any buffers allocated therein. If that additional pinned memory block contains no currently used pinned memory buffers, the periodic processing of the kernel memory allocation module releases that additional pinned kernel memory block.

The simplified example physical memory configuration 300 shows the base pinned kernel memory block 304, first additional kernel memory block 306 and second additional kernel memory block 308 as occupying sequential memory locations. This sequential allocation is shown for simplicity of illustration and in the operation of the example embodiment; the additional pinned kernel memory blocks that are allocated to the pinned kernel memory pool are able to be located in disparate areas of the kernel memory supporting the processor 202. The example embodiments of the present invention support utilizing a pinned kernel memory pool that comprises non-contiguous memory blocks by maintaining the multiple pinned kernel memory blocks through a linked list structure. The maintenance of a linked list structure allows efficient processing for adding and removing additional pinned kernel memory blocks, such as the first additional pinned kernel memory block 306 and the second additional pinned kernel memory block 308, within the pinned kernel memory pool. Implementing a pinned kernel memory pool with non-contiguous pinned kernel memory also provides flexibility to the operating system's use of the remaining kernel memory, since the allocated pinned kernel memory pool is not one, large contiguous block of kernel memory.

Figure 4:
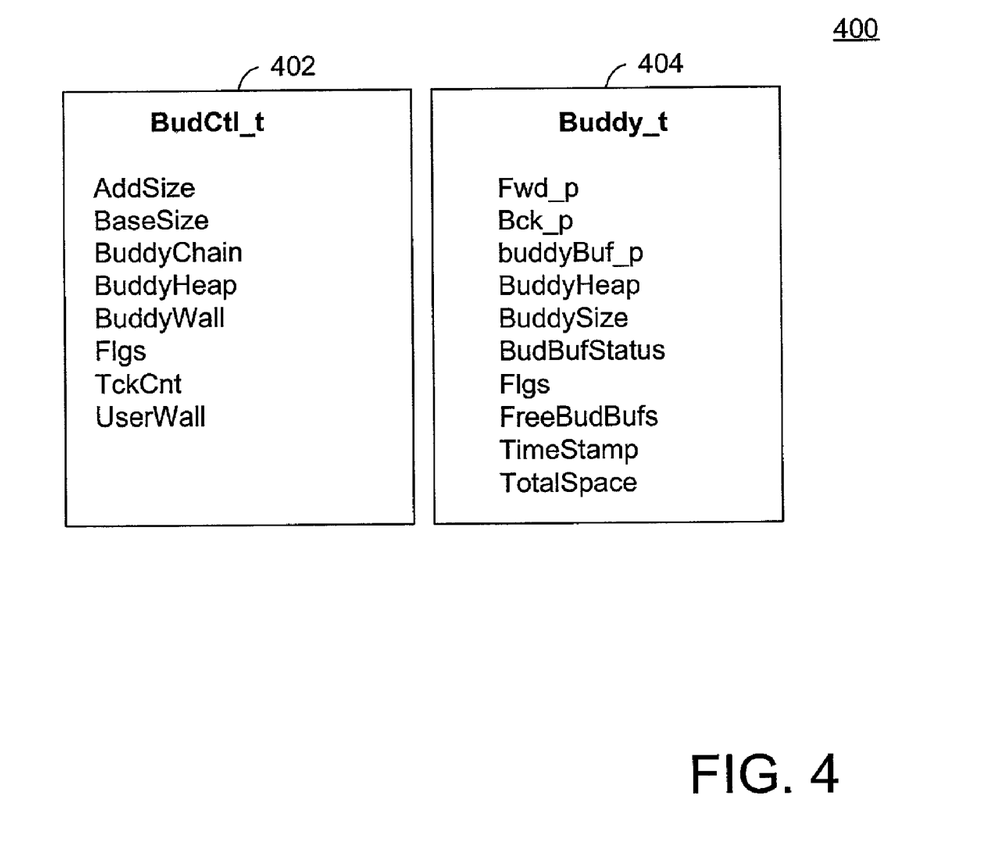
FIG. 4 illustrates the data elements associated with allocated pinned kernel memory as maintained by an example embodiment of the present invention.

The pinned kernel memory control data structures 400 utilized by the example embodiments are shown in FIG. 4. The pinned kernel memory blocks are alternatively referred to as buddy buffers in this description. These buddy buffers are allocated within a "buddy heap" which comprises kernel memory segments. The BudCtl_t data structure 402 contains information which controls the operation of the kernel memory allocation module. The BudCtl_t data structure 402 comprises the data element AddSize, which defines the size of the additional pinned kernel memory blocks that are to be added to the pinned kernel memory pool. The example embodiment allocates additional pinned kernel memory buffers that are of a fixed size. Alternative embodiments are able to allocate additional pinned kernel memory buffers that are variable in size. The BaseSize data element defines the size of the base pinned kernel memory block 304 that forms the initial pinned kernel memory pool. The BuddyChain data element is a pointer to the initial element of the linked list of data structures, whose structure is defined by the Buddy_t structure 404, that are associated with the base pinned kernel memory block 304 and the additional pinned kernel memory blocks, such as the first additional pinned kernel memory block 306 and the second additional pinned kernel memory block 308. The BuddyHeap data element is a pointer to the memory heap area from which pinned kernel memory is allocated. The use of a BuddyHeap data element in this control structure allows different memory regions to be used for the allocation of pinned kernel memory pools.

The BudCtl_s data structure 402 further contains the BuddyWall data element that defines the maximum size, specified in Megabytes and rounded to the nearest Megabyte, which may be allocated to the pinned kernel memory pool. The Flgs data element contains a number of flags that are used to control the operation of the allocated pinned kernel memory pool. Flags utilized in an example embodiment of the present invention are ChkBuddyBsy, which indicates to check for idle memory blocks that can be returned to the system and BuddyBufInSegHeap, which indicates if the pinned kernel memory pool is in the processor's segment heap.

The BudCtl_s data structure 402 further contains the TckCnt, which is the counter maintained by the release period timer, as is described below, to determine the time remaining until the next activation of the kernel memory pool release processing 600. The UsrWall element also defines the largest size to which the pinned kernel memory pool may grow, but is specified as a number of bytes.

The Buddy_t data structure 404 contains a number of data elements which relate to and contain control information about the individual pinned kernel memory blocks maintained by the kernel memory allocation processing module. The Fwd_p element is a pointer which points to the next Buddy_t control data structure in the linked list of data structures for the allocated pinned kernel memory blocks. The Bck_p element similarly points to the preceding Buddy_t data structure in the linked list. The BuddyBuf_p element is a pointer to the kernel memory comprising the pinned kernel memory block associated with that instance of the data structure. The BuddyHeap data element is a pointer to the memory heap within which the kernel memory block, indicated by BuddyBuf_p, is allocated. The BuddySize data element defines the size of the pinned kernel memory block that is associated with this data structure. The BudBufStatus data element indicates the status of the pinned kernel memory block that is associated with this structure. The BudBufStatus element may indicate that the pinned kernel memory block is in use, i.e., that pinned kernel memory buffers are allocated therein, or the BudBufStatus element may indicate that the block is free, i.e. that there are no buffers allocated therein. The Flgs element contain the same flag elements as described for the BudCtl_s structure 402, but which pertain to the pinned kernel memory block associated with this data structure. The FreeBudBuffs is a pointer to a linked list of unallocated pinned kernel memory buffers within the pinned kernel memory block associated with this data structure. The TimeStamp element indicates the time when a pinned kernel memory buffer was last allocated from the pinned kernel memory pool. The TotalSpace element indicates the total amount of memory allocated to this kernel memory block.

Figure 5:
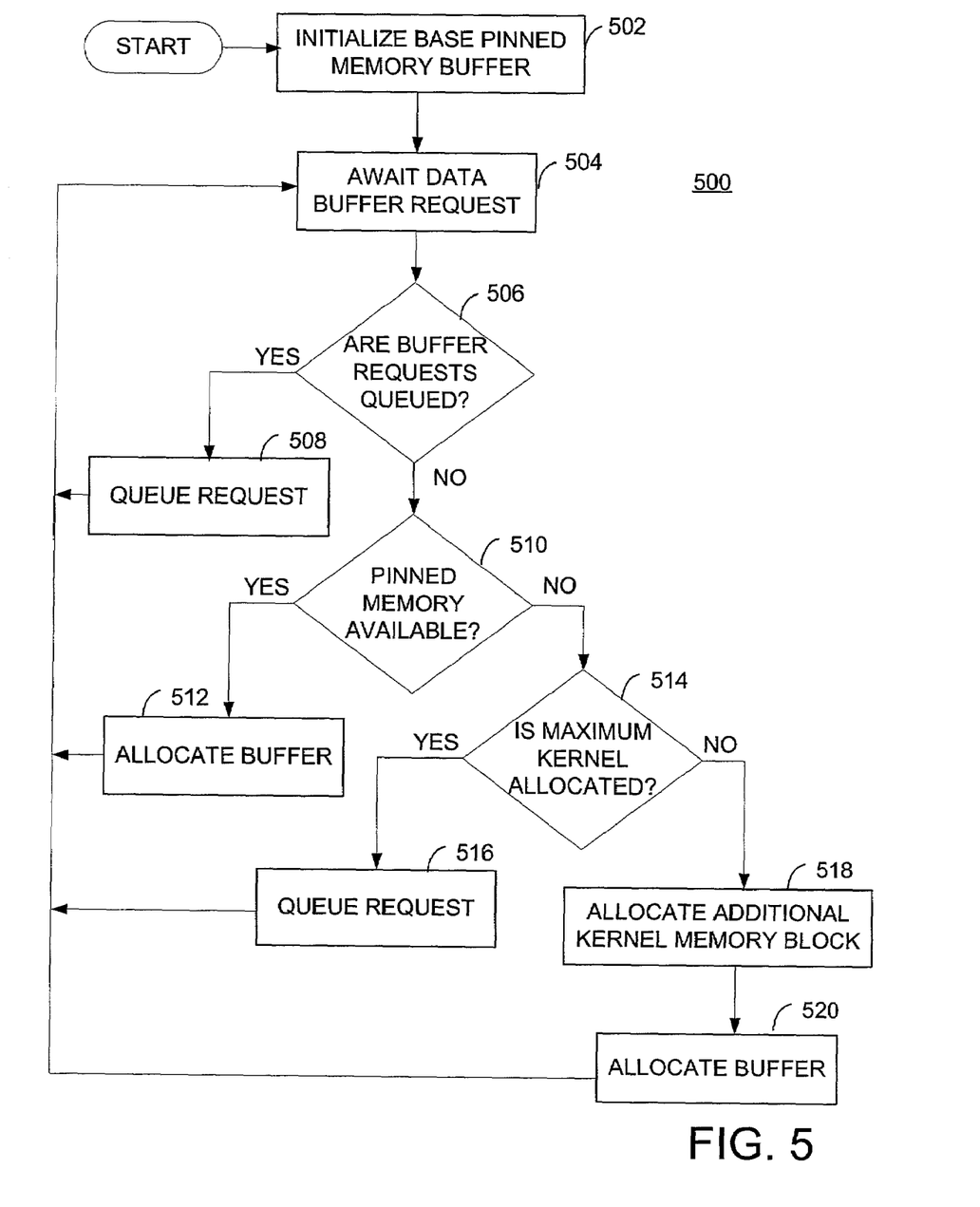
FIG. 5 is a processing flow diagram illustrating the processing used to allocate pinned kernel memory blocks to a pinned kernel memory pool in accordance with an example embodiment of the present invention

An example pinned kernel memory allocation processing flow 500 performed for an example kernel memory allocation module that incorporates an example embodiment of the present invention is illustrated in FIG. 5. The kernel memory allocation module of the example embodiment comprises the processor 202 that performs the processing described herein. The processing of this example embodiment begins with step 502 wherein a base pinned kernel memory buffer 304 is allocated for the associated processing module. This base pinned kernel memory buffer 304 improves the processing efficiency by allowing a small amount of pinned kernel memory to be available to the associated processing module without requiring the processing associated with allocating new pinned kernel memory blocks.

Once the base pinned kernel memory buffer 304 has been allocated, the pinned kernel memory buffer allocation processing 500 awaits, in step 504, for a request for a pinned kernel memory buffer by the associated processing module. The pinned kernel memory request by the processing module specifies the amount of memory required by that buffer. The processing of the example embodiment allocates pinned kernel memory buffers in sizes that are either four kilobytes in size or in sizes that are four kilobytes times integer multiples of two, e.g. 8 KB, 16 KB, 32 KB and so on. The buffer sizes are usually equal to or less than 256 KB, but the buffer size is practically limited by the size of unallocated portions of the pinned kernel memory pool. The allocation of buffers that have one of a limited number of fixed sizes improves the efficiency of reusing memory within the pinned kernel memory pool after those buffers are released. Allocating buffers with discrete sizes in the example embodiment results in allocated pinned kernel memory buffers, in response to a request for an arbitrary size, that are either the requested size, if the requested size is equal to one of the sizes that is allocated by the particular embodiment, or the next largest size if that particular embodiment does not allocate buffers of the exact size requested.

Upon receipt of a request for a pinned kernel memory buffer, processing advances to step 506 to determine if there are currently queued pinned kernel memory requests by the associated processing module. If there are currently queued requests, it is assumed by the processing of the example embodiment that additional pinned kernel memory buffers are not available, and therefore additional pinned kernel memory buffers cannot be allocated. If there are queued requests, the present request is also queued, in step 508, and processing returns to step 504 to await further pinned kernel memory buffer requests. The processing of queued request is handled in the example embodiment upon release of a pinned kernel memory buffer by the associated processing module. Upon release of a pinned kernel memory buffer, the processing determines if there are queued pinned kernel memory buffer requests and determines if there is sufficient memory to allocate the requested buffer. If a buffer for the queued buffer request may be allocated within the pinned buffer memory pool, the buffer is allocated and the request is de-queued.

If the processing of step 506 determines that there are no queued pinned kernel memory buffer requests, the processing of the example embodiment advances to step 510 to determine if sufficient pinned kernel memory to allocate the requested buffer is available within the pinned kernel memory pool. If sufficient pinned kernel memory is available in the currently allocated pinned kernel memory pool, the requested buffer is allocated, in step 512, from within the pinned kernel memory pool that is allocated to the requesting processing module. Processing then returns to step 504 to await further requests for kernel memory buffers.

The processing of step 512 allocates pinned kernel memory buffers within the additional pinned kernel memory blocks in the order in which the additional pinned kernel memory blocks were allocated to the pinned kernel memory pool. For example, the processing of step 512 first examines the base pinned kernel memory block 304 to determine if the requested buffer may be allocated therein. If there is insufficient memory available in the base pinned kernel memory block 304 and additional pinned kernel memory blocks have been allocated, the processing of step 512 examines the first additional kernel memory block 306 to determine if sufficient memory is available therein to allocate for the requested pinned kernel memory buffer. If insufficient memory is available in the first additional kernel memory block 306 that has been allocated, the processing continues to sequentially examine subsequently allocated memory blocks until an available memory block is found. Alternative embodiments of the present invention may allocate pinned kernel memory buffers in arbitrary areas of the pinned kernel memory pool or allocate buffers within the additional pinned kernel memory blocks in different orders.

The processing advances to step 514 if the processing of step 510 determines that insufficient memory is available within the currently allocated pinned kernel memory pool that is currently allocated to the processing module requesting the pinned kernel memory buffer. The processing of step 514 determines if the maximum amount of pinned kernel memory has been allocated to the pinned kernel memory pool that is associated with the requesting processing module. If the maximum amount of pinned kernel memory has been allocated to that processing module, processing continues with step 516 wherein the pinned kernel memory buffer request is queued until the requested amount of pinned kernel memory becomes available. Processing then returns to step 504 to await further pinned kernel memory buffer requests.

If the processing of step 514 determines that the maximum amount of kernel memory has not been allocated to the pinned kernel memory pool, processing advances to step 518 wherein an additional kernel memory block is allocated to the pinned kernel memory pool associated with the requesting process. The example embodiment allocates additional pinned memory blocks which are of equal size. The size of the additional pinned kernel memory blocks in the example embodiments are a specified fraction of the total amount of pinned kernel memory which may be allocated to the pinned kernel memory pool.

Following allocation of the additional kernel memory block in step 518, the requested pinned kernel memory buffer is allocated for use by the requesting processing module in step 520. Once the pinned kernel memory buffer has been allocated, the memory allocation processing for this request terminates and processing continues with step 504 to await an additional pinned kernel memory request.

Figure 6:
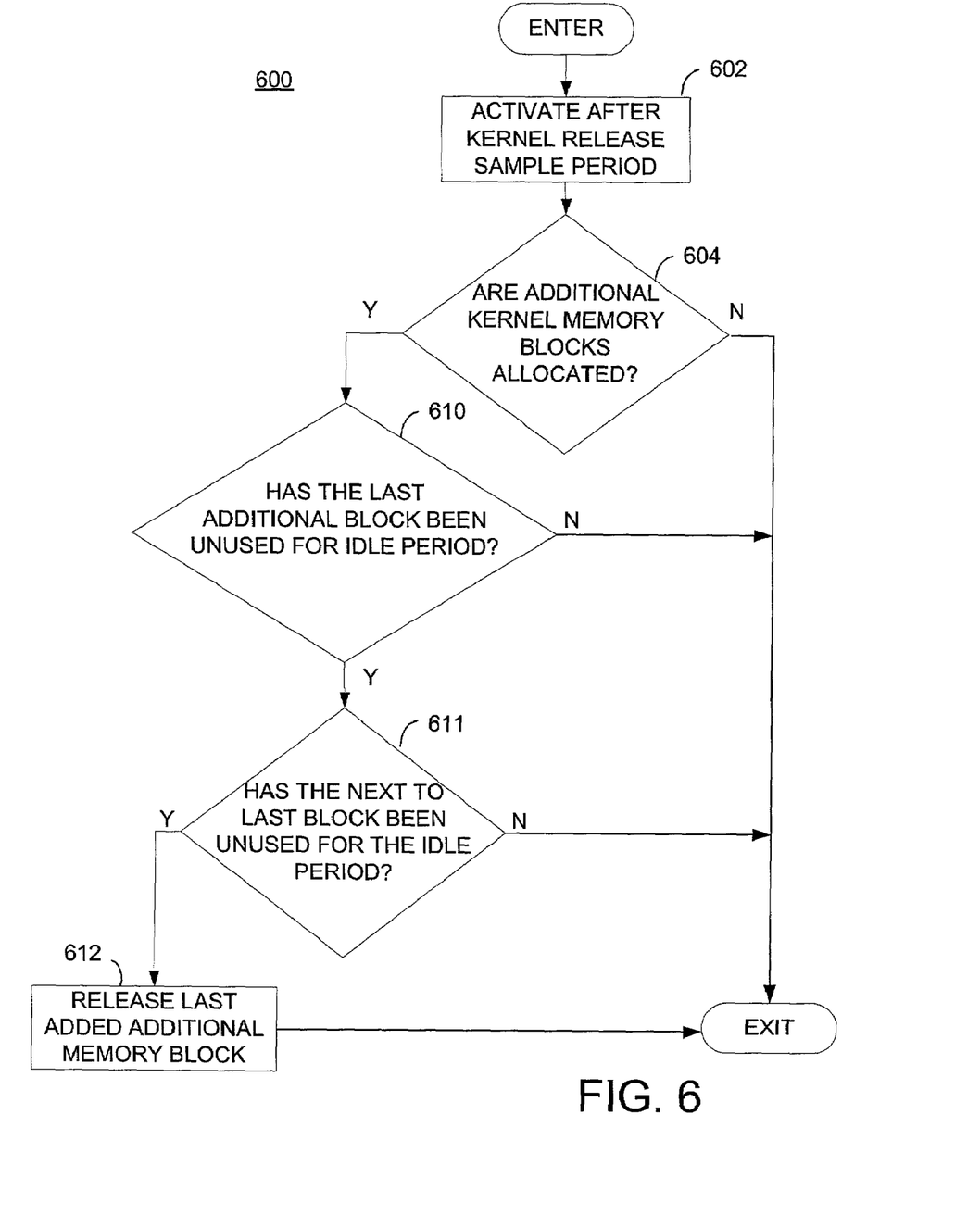
FIG. 6 is a processing flow diagram illustrating the processing used to release pinned kernel memory blocks from a pinned kernel memory pool in accordance with an example embodiment of the present invention

An example kernel memory pool release processing 600 performed by the kernel memory allocation module of the example embodiment is illustrated in FIG. 6. The example embodiment periodically examines the pinned kernel memory buffers that are allocated within the kernel memory pool that is associated with processing modules within the data processing equipment 102.

The kernel memory pool release processing 600 of the example embodiment begins, in step 602, by activating when the kernel release sample period has expired. The kernel release sample period is the period between processing the iterations of the kernel memory pool release processing 600 within the example embodiment. The kernel release sample period in the example embodiment is determined by initially setting an iteration counter that is decremented every 0.5 seconds. When the counter decrements to zero, processing continues with the remainder of the kernel memory pool release processing. The kernel release sample period in the example embodiment is sixty seconds. Alternative embodiments may use other events or mechanisms to trigger the kernel memory pool release processing 600 or alternative kernel memory pool release processing used in other embodiments of the present invention. Other events which may alternatively trigger kernel memory pool release processing include an event signaling an end of a transfer process, an exception event that accompanies a release of memory, or other operational events that create an opportunity for freeing up memory for the system Once the kernel release sample period has expired, according to the present example, processing continues with step 604 to determine if additional kernel memory blocks, such as the first additional kernel memory block 306 and the second additional kernel memory block 308, have been allocated to any kernel memory pools allocated to processing modules. If no additional kernel memory blocks have been allocated, processing exits to await reactivation of the kernel memory pool release processing 600. If additional pinned kernel memory blocks have been allocated, the processing advances to step 610 to determine if the last additional kernel memory block has not had any pinned kernel memory buffers allocated therein for a specified idle period. The idle period is set to five minutes in the example embodiments and alternative embodiments may utilize different idle times to reflect the operational characteristics or requirements of different applications. If memory buffers have been allocated within the additional pinned kernel memory block being examined within the idle period, the processing of the example embodiment assumes that no further additional kernel memory blocks may be released and processing exits to await the next iteration of the kernel memory pool release processing 600.

If the processing of step 610 in the example embodiment determines that there are no pinned kernel memory buffers currently allocated within the last added kernel memory and no buffers have been allocated in that block within a certain idle time period, which is set to five minutes in the example embodiment, processing advances to step 611 to determine if the next to last kernel memory block has had any pinned kernel memory buffers allocated therein for a specified idle period. The kernel memory pool release processing of the example embodiment ensures that at least one empty pinned kernel memory block remains prior to releasing a pinned kernel memory block. This allows headroom in the allocation of pinned kernel memory buffers in order to support ready allocation of new buffers should a sudden increase in demand be encountered. Maintaining this headroom in the kernel memory pool release processing is particularly advantageous since the processing module associated with the pinned kernel memory pool has recently required the amount of pinned kernel memory currently allocated and may therefore need the memory again. If the processing of step 611 determines that the previous memory block has had no buffers allocated therein within the specified idle time period, processing continues with step 612, wherein the last additional memory block is released. Processing then exits to await the next iteration of the kernel memory pool release processing 600

The example embodiments of the present invention that are described above periodically monitor the allocation of pinned kernel memory buffers within the different pinned kernel memory blocks that comprise the pinned kernel memory pool. In the above example embodiments, this monitoring identifies pinned kernel memory blocks to release based upon the allocation of pinned kernel memory buffers in the blocks. Alternative embodiments may incorporate statistical analysis of pinned kernel memory allocation to better determine anticipated pinned kernel memory requirements by the associated processing module.

The example embodiments of the present embodiment allow more efficient utilization of the physical memory in systems which implement virtual memory management. The example embodiments allow efficient operation of data communication processing modules by allowing flexible allocation of physical memory for use as pinned kernel memory buffers to accommodate various data communications requirements. The operation of these example embodiments of the present invention obviates the need of the prior art systems to determine, through system analysis and/or lengthy trial and error, the required size of pinned kernel memory with which to configure data communications processing modules.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for allocating non-pageable pinned kernel memory for use by time sensitive data communications processing, the method comprising the steps of:

establishing a base non-pageable pinned kernel memory block;

accepting a request for a non-pageable pinned kernel memory buffer, wherein the request comprises a specification of a buffer size for the non-pageable pinned kernel memory buffer;

determining if the base non-pageable pinned kernel memory block contains sufficient non-pageable pinned kernel memory for the non-pageable pinned kernel memory buffer; and allocating, in response to a determination that there is insufficient non-pageable pinned kernel memory within the base non-pageable pinned kernel memory block, an additional non-pageable pinned kernel memory block that is at least as large as the buffer size and wherein the additional non-pageable pinned kernel memory block is not required to form a contiguous non-pageable pinned kernel memory section with the base non-pageable pinned kernel memory block, and wherein the additional non-pageable pinned kernel memory block has a predetermined size.

2. The method according to claim 1, wherein the base non-pageable pinned kernel memory block, the additional non-pageable pinned kernel memory block and the non-pageable pinned kernel memory buffer are allocated by a non-pageable kernel memory allocation module.

3. The method according to claim 1, wherein the additional non-pageable pinned kernel memory block is accessed through a linked list structure.

4. The method according to claim 1, wherein the request for the non-pageable pinned kernel memory buffer is received from a mass storage data server application processing module.

5. The method according to claim 1, further comprising the steps of:

accepting a subsequent request for a second non-pageable pinned kernel memory buffer, wherein the subsequent request comprises a second specification of a second buffer size for the second non-pageable pinned kernel memory buffer;

determining if the base non-pageable pinned kernel memory block and the additional non-pageable pinned kernel memory block contain sufficient non-pageable pinned kernel memory for the second non-pageable pinned kernel memory buffer; and allocating, in response to a determination that there is insufficient non-pageable pinned kernel memory within the base non-pageable pinned kernel memory block and the additional non-pageable pinned kernel memory block, a second additional non-pageable pinned kernel memory block that is at least as large as the second buffer size and wherein the second additional non-pageable pinned kernel memory block is not required to form a contiguous non-pageable pinned kernel memory section with either the base non-pageable pinned kernel memory block or the additional non-pageable pinned kernel memory block.

6. A method of releasing memory allocated to a memory pool, wherein pinned memory buffers are temporarily allocated and not relocated within the memory pool and wherein additional memory blocks are sequentially added to the memory pool, the method comprising the steps of:

periodically examining a set of last two memory blocks to determine if at least one memory buffer is allocated therein; and releasing a last added additional memory block if the step of periodically examining determines that there are no memory buffers allocated within the set of last two memory blocks.

7. A system for allocating non-pageable pinned kernel memory for use by time sensitive data communications processing, the system comprising:

a non-pageable pinned kernel memory; and a non-pageable kernel memory allocation module, communicatively coupled to the non-pageable pinned kernel memory, wherein the non-pageable kernel memory allocation module:

establishes a base non-pageable pinned kernel memory block within the non-pageable pinned kernel memory;

accepts a request for a non-pageable pinned kernel memory buffer, wherein the request comprises a specification of a buffer size for the non-pageable pinned kernel memory buffer;

determines if the base non-pageable pinned kernel memory block contains sufficient non-pageable pinned kernel memory for the non-pageable pinned kernel memory buffer; and allocates, in response to a determination that there is insufficient non-pageable pinned kernel memory within the base non-pageable pinned kernel memory block, an additional non-pageable pinned kernel memory block within the non-pageable pinned kernel memory that is at least as large as the buffer size, and wherein the additional non-pageable pinned kernel memory block has a predetermined size.

8. The system according to claim 7, wherein the non-pageable kernel memory allocation module:

determines if the base non-pageable pinned kernel memory block and the additional non-pageable pinned kernel memory block contain sufficient non-pageable pinned kernel memory for a second non-pageable pinned kernel memory buffer; and allocates, in response to a determination that there is insufficient non-pageable pinned kernel memory within the base non-pageable pinned kernel memory block and the additional non-pageable pinned kernel memory block, a second additional non-pageable pinned kernel memory block that is at least as large as the second buffer size and wherein the second additional non-pageable pinned kernel memory block is not required to form a contiguous non-pageable pinned kernel memory section with either the base pinned non-pageable kernel memory block or the additional non-pageable pinned kernel memory block.

9. The system according to claim 7, wherein the additional non-pageable pinned kernel memory block does not form a contiguous non-pageable pinned kernel memory block with the base non-pageable pinned kernel memory block.

10. The system according to claim 7, wherein the additional non-pageable pinned kernel memory block is accessed through a linked list structure.

11. The system according to claim 7, wherein the request for the non-pageable pinned kernel memory buffer is received from a mass storage data server application processing module.

12. The system according to claim 7, wherein the non-pageable kernel memory allocation module further:

accepts a subsequent request for a second non-pageable pinned kernel memory buffer, wherein the subsequent request comprises a second specification of a second buffer size for the second non-pageable pinned kernel memory buffer;

determines if the base non-pageable pinned kernel memory block and the additional non-pageable pinned kernel memory block contain sufficient non-pageable pinned kernel memory for the non-pageable second pinned kernel memory buffer; and allocates, in response to a determination that there is insufficient non-pageable pinned kernel memory within the base non-pageable pinned kernel memory block and the additional non-pageable pinned kernel memory block, a second additional non-pageable pinned kernel memory block that is at least as large as the second buffer size.

13. A system for allocating memory for use by time sensitive data communications processing, the system comprising:

a kernel memory; and a kernel memory allocation module, communicatively coupled to the kernel memory, wherein the kernel memory allocation module:

establishes a base memory block within the kernel memory;

accepts a request for a memory buffer, wherein the request comprises a specification of a buffer size for the memory buffer;

determines if the base memory block contains sufficient memory for the memory buffer; and allocating, in response to a determination that there is insufficient memory within the base memory block, an additional memory block within the kernel memory that is at least as large as the buffer size; and the system further comprising:

pinned memory buffers, wherein the pinned memory buffers are temporarily allocated and not relocated within a memory pool and wherein additional memory blocks are sequentially added to the memory pool, and wherein the kernel memory allocation module further:

periodically examines a set of last two memory blocks to determine if at least one memory buffer is allocated therein; and releases a last added additional memory block if the step of periodically examining determines that there are no memory buffers allocated within the set of last two memory blocks.

14. A tangibly embodied computer readable medium including computer instructions for allocating non-pageable pinned kernel memory for use by time sensitive data communications processing, the computer instructions comprising instructions for:

establishing a base non-pageable pinned kernel memory block;

accepting a request for a non-pageable pinned kernel memory buffer, wherein the request comprises a specification of a buffer size for the non-pageable pinned kernel memory buffer;

determining if the base non-pageable pinned kernel memory block contains sufficient non-pageable pinned kernel memory for the non-pageable pinned kernel memory buffer; and allocating, in response to a determination that there is insufficient non-pageable pinned kernel memory within the base non-pageable pinned kernel memory block, an additional non-pageable pinned kernel memory block that is at least as large as the buffer size and wherein the additional non-pageable pinned kernel memory block is not required to form a contiguous non-pageable pinned kernel memory section with the base non-pageable pinned kernel memory block, wherein the additional non-pageable pinned kernel memory block has a predetermined size.

15. The computer readable medium according to claim 14, wherein the base non-pageable pinned kernel memory block, additional non-pageable pinned kernel memory block and the non-pageable pinned kernel memory buffer are allocated by a non-pageable kernel memory allocation module.

16. The computer readable medium according to claim 14, wherein the additional non-pageable pinned kernel memory block is accessed through a linked list structure.

17. The computer readable medium according to claim 14, wherein the request for the non-pageable pinned kernel memory buffer is received from a mass storage data server application processing module.

18. The computer readable medium according to claim 14, further including computer instructions for:

accepting a subsequent request for a second non-pageable pinned kernel memory buffer, wherein the subsequent request comprises a second specification of a second buffer size for the second non-pageable pinned kernel memory buffer;

determining if the base non-pageable pinned kernel memory block and the additional non-pageable pinned kernel memory block contain sufficient non-pageable pinned kernel memory for the second non-pageable pinned kernel memory buffer; and allocating, in response to a determination that there is insufficient non-pageable pinned kernel memory within the base non-pageable pinned kernel memory block and the additional non-pageable pinned kernel memory block, a second non-pageable additional pinned kernel memory block that is at least as large as the second buffer size and wherein the second additional non-pageable pinned kernel memory block is not required to form a contiguous non-pageable pinned kernel memory section with either the base non-pageable pinned kernel memory block or the additional non-pageable pinned kernel memory block.

19. A tangibly embodied computer readable medium including computer instructions for releasing memory allocated to a memory pool, wherein pinned memory buffers are temporarily allocated and not relocated within the memory pool and wherein additional memory blocks are sequentially added to the memory pool, the computer instructions comprising instructions for:

periodically examining a set of last two memory blocks to determine if at least one memory buffer is allocated therein; and releasing a last added additional memory block if the step of periodically examining determines that there are no memory buffers allocated within the set of last two memory blocks.

* * * * *